United States Patent [19]

Hayakawa

[11] Patent Number: 4,796,113
[45] Date of Patent: Jan. 3, 1989

[54] METHOD AND APPARATUS FOR AUTOMATICALLY REPLACING DEFECTIVE RECORDING TRACKS IN DATA STORAGE APPARATUS

[75] Inventor: Yuji Hayakawa, Nagoya, Japan
[73] Assignee: Brother Kogyo Kabushiki Kaisha, Aichi, Japan
[21] Appl. No.: 940,404
[22] Filed: Dec. 11, 1986
[30] Foreign Application Priority Data
Dec. 17, 1985 [JP] Japan .................. 60-284101
[51] Int. Cl.[4] .................. G11B 21/08; G11B 5/55; G11B 5/09
[52] U.S. Cl. .................. 371/10; 360/48; 360/49; 78.14; 360/78.14; 369/54
[58] Field of Search .................. 360/31, 53, 78, 105, 360/75, 48, 49; 369/54, 58; 364/200, 900; 371/10, 11; 365/200

[56] References Cited

U.S. PATENT DOCUMENTS 4,498,146 2/1985 Martinez .................. 364/900

FOREIGN PATENT DOCUMENTS

| 55-113137 | 9/1980 | Japan | 369/58 |
| 56-165968 | 12/1981 | Japan | 369/58 |
| 57-105869 | 7/1982 | Japan | 360/78 |
| 58-1809 | 1/1983 | Japan | 360/78 |
| 58-35733 | 3/1983 | Japan | 369/58 |

Primary Examiner—Vincent P. Canney
Assistant Examiner—Steven R. Garland
Attorney, Agent, or Firm—Parkhurst, Oliff & Berridge

[57] ABSTRACT

A data storage apparatus wherein a read/write head writes or reads information on or from a rotating storage disk having a multiplicity of tracks, according to external signals. The storage disk has a special track which is unaccessible with the external signals, and which has multiple divisions corresponding to the tracks, the divisions consisting of first divisions and at least one second division, each of the first divisions corresponding to each normal track having no defect, and each of the at least one second division corresponding to each defective track which has a defect. Either the first divisions or the at least one second division storing burst signals indicative of the normal and defective tracks. The apparatus comprises a device for operating a head-positioning device and the read/write head to read the burst signals on the special track, and storing an identification number of each defective track, and a device responsive to a track access signal of the external control signals designating one of the normal and defective tracks, for counting a number of the at least one defective track whose identification number is smaller than that of the designated track, and positioning the read/write head on the track whose identification number is larger, by the counted number, than that of the designated track.

13 Claims, 5 Drawing Sheets

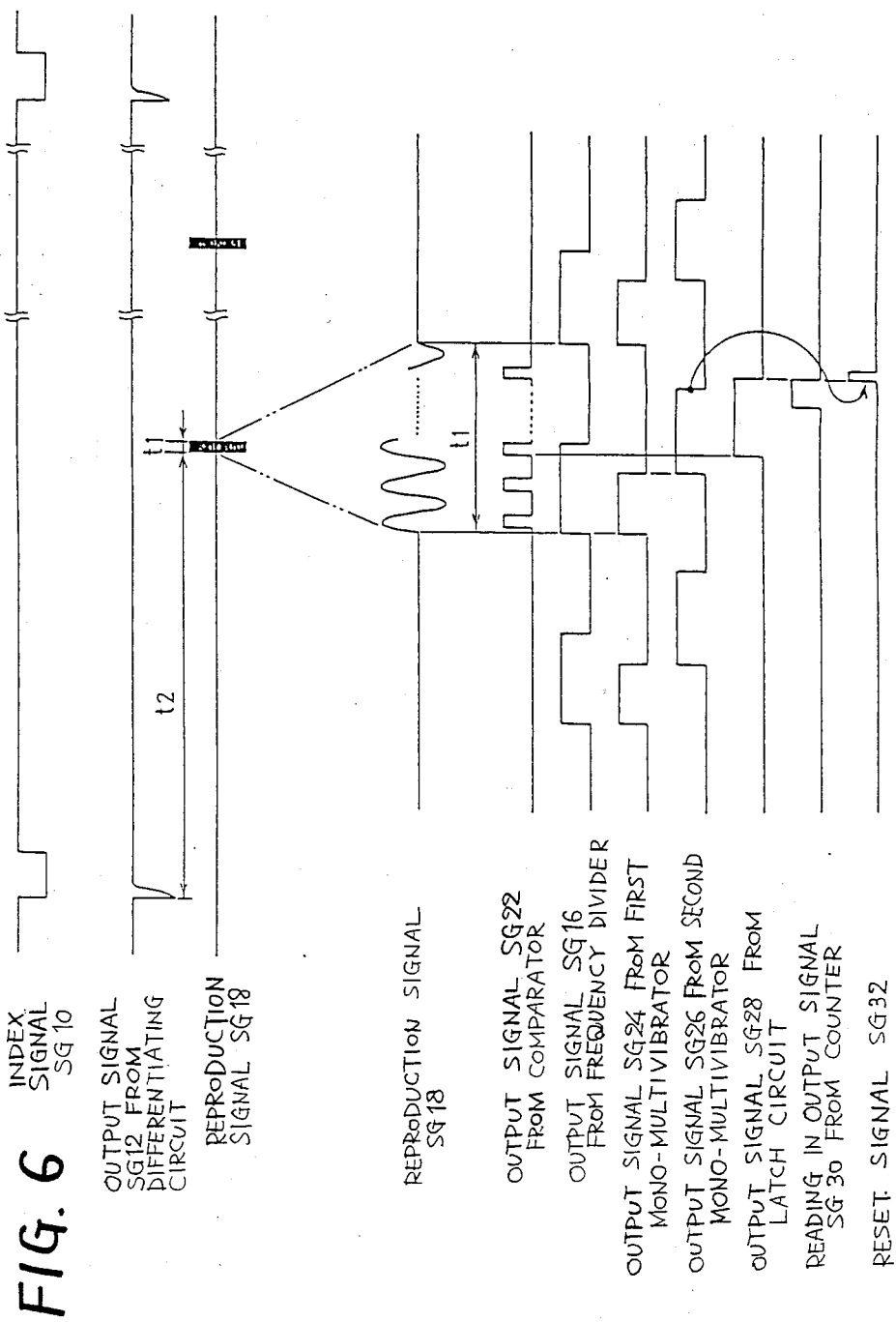

METHOD AND APPARATUS FOR AUTOMATICALLY REPLACING DEFECTIVE RECORDING TRACKS IN DATA STORAGE APPARATUS

BACKGROUND OF THE INVENTION

1. Field of the Invention

The present invention relates generally to data storage method and apparatus for recording and retrieval of information on and from a data storage medium in the form of a magnetic, optical or other memory disk having a multiplicity of recording tracks. More particularly, the invention is concerned with a technique for determining alternative tracks used in place of defective tracks when an external device commands the apparatus to record information on the defective tracks.

2. Discussion of the Prior Art

It is ideal that a data storage medium such as a magnetic or optical memory disk is completely free from defects on their recording surfaces. However, the present technology for fabricating such memory disks does not permit complete elimination of the defects. For example, a magnetic disk inevitably suffers from defects due to low surface accuracy of a substrate, inconsistency in connection with coatings of the substrate surfaces with a magnetic material, or pin holes in the magnetic coatings. For maintaining the yield of the product at a sufficiently high level, the manufacturers are therefore forced to offer such data storage media as acceptable products even if they have some limited number of defects.

A conventional approach to enable the use of such partially defective data storage media is to use a specific track such as track #0 for prerecording defective-track data indicative of the locations of defective tracks. For instance, if a memory disk has defects in tracks #200 and #250, the prerecorded defective-track data represents alternative tracks #304 and #305 for the defective tracks #200 and #250, respectively. When a data storage apparatus using such a memory disk is turned on, the defective-track data is transferred to a controller, which selects the alternative track #304 when the defective track #200 is accessed by an access signal from an external host computer. Similarly, the controller selects the alternative track #305 when the defective track #250 is designated by the host computer. This arrangement makes it possible to use a data storage medium which has some defects, and eliminates a need for the host computer to check the recording tracks for any defects, after the start of the data storage apparatus. Therefore, the throughput time may be diminished.

In the conventional arrangement described above, however, the manufacturer of the data storage apparatus loaded with partially defective data storage media must provide a user such as a computer manufacturer with a list of the defective tracks, so that the user may prerecord the alternative-track data on an appropriate track (such as track #0), or store the data in a read-only memory (ROM) built in a controller board, for automatic selection of alternative tracks in place of the defective tracks. Further, if the data storage apparatus is removed from one computer and installed in another computer, or if the format of the storage media is changed, it is necessary to re-record the alternative-track data on the media or change the previously stored data in the memory, requiring extra time.

Moreover, the above method does not allow the use of a data storage medium which has a defect in the special track on which the alternative-track data is stored. That is, if the special track of the medium has a defect, this means that the medium should be rejected.

Generally, an operation to write or read information on or from a storage medium proceeds from one track to the next. Therefore, if the radially innermost or outermost track and the adjacent tracks are used as alternative tracks for defective tracks, as indicated above, the read/write head must be moved to the radially inner or outer alternative track each time the defective track is externally accessed. This results in increased time for positioning the read/write head on the alternative tracks, leading to increased throughput time of the data storage apparatus.

SUMMARY OF THE INVENTION

It is therefore an object of the present invention to provide a data storage method and an apparatus suitable for practicing the same, which permit automatic determination of alternataive tracks of data storage media, in place of defective tracks, so that the apparatus is operated as if the data storage media had no defective tracks, for an external device which commands the apparatus to implement an information writing or reading operation.

It is a second object of the invention to provide such data storage method and apparatus which assure a minimum time for positioning a read/write head from an externally designated track to its alternative track.

A third object of the invention is to provide such a data storage apparatus provided with a data storage medium having a special track which is not accessible by external command signals and which stores prerecorded data indicative of all defective tracks on the storage medium.

A fourth object of the invention is the provision of such a data storage apparatus which permits the use of the storage medium even if the special track has a defect.

The first and second objects in connection with the method, may be achieved according to one aspect of the present invention, which provides a method of writing or reading information on or from a storage medium in the form of a disk having a multiplicity of concentric recording tracks identified by respective identification numbers, the tracks including at least one defective track which has a defect, the method comprising the steps of: obtaining the identification number of each of the at least one defective track; when a writing or reading operation is required on one of the at least one defective track, selecting another of the multiplicity of tracks whose identification number is larger by one than that of the one of the at least one defective track, and effecting the writing or reading operation on the another track; and when a writing or reading operation is required on the another track, selecting yet another of the tracks whose identification number is larger by one than the another track, and effecting the writing or reading operation on the yet another track.

The first and second objects in connection with the method, may also be achieved according to another aspect of the invention, which provides a method of writing or reading information on or from a storage medium in the form of a disk having a multiplicity of concentric recording tracks identified by respective identification numbers, the tracks including at least one defective track which has a defect, the method comprising the steps of: obtaining the identification number of each of the at least one defective track; when a writing or reading operation is required on selected one of the multiplicity of tracks, counting a number of the at least one defective track whose identification number is smaller than that of the selected one track; and selecting another of the multiplicity of tracks whose identification numer is larger, by the counted number of the at least one defective track, than that of the selected one track, and effecting the writing or reading operation on the another track.

In one form of the invention, the method further comprises a step of storing defective-track data indicative of the identification number of each defective track, in a special track which is provided on the storage medium and which is unaccessible with an external track-access signal.

All of the above three objects in connection with the apparatus, may be achieved according to a further aspect of the present invention, which provides a data storage apparatus including at least one storage medium in the form of a disk having a multiplicity of concentric recording tracks identified by respective identification numbers, a device for rotating all of the at least one storage medium as a unit, at least one read/write head corresponding to a recording surface of each of the at least one storage medium and movable along the surface of the corresponding storage medium substantially in a radial direction of the corresponding medium, a head-positioning device for moving the at least one read/write head, and a read/write control device for controlling a reading and a writing operation of the at least one read/write head according external control signals, characterized in that at least one of the above-indicated at least one storage medium has a special track which is unaccessible with the external control signals, and which has a multiplicity of divisions corresponding to the recording tracks, the divisions of the special track consisting of a plurality of first divisions and at least one second division, each of the first divisions corresponding to each normal track cylinder consisting of the tracks of the at least one storage medium which have the same identification numbers and none of which has a defect, and each of the above-indicated at least one second division corresponding to each of at least one defective track cylinder consisting of the tracks of the at least one storage medium which have the same identification numbers and at least one of which has a defect, one of each first division and each second division storing burst signals indicative of one of the normal and defective track cylinders, the head-positioning device being operable to position the read/write head on the special track, the data storage apparatus comprising: first means for operating the head-positioning device and the read/write head to read the burst signals on the special track, and storing defective-cylinder data representative of an identification number of each defective track cylinder; and second means responsive to a cylinder-access signal of the external control signals designating one of the normal and defective track cylinders, for counting a number of the at least one defective cylinder whose identification number is smaller than that of the designated one track cylinder, the second means controlling the head-positioning device to position the read/write head on another of the track cylinders whose identification number is larger, by the counted number, than that of the designated one track cylinder.

The special track may be disposed either radially outwardly or radially inwardly of the multiplicity of recording tracks which are accessible with the external cylinder-access signal. Generally, the track cylinders (recording tracks) are numbered so that the identification number increases in the radially inward direction of the storage medium. However, the numbering of the track cylinders may be done so that the identification number increase in the radially outward direction.

In the data storage apparatus of the present invention constructed as described above, not only a defective track of a single storage medium, but also a normal track of each of the other storage media, if any, which corresponds to the defective track, cannot be used as part of a defective track cylinder. In other words, a defective track cylinder consists of a defective track of a single media, or a plurality of corresponding tracks of two or more storage media at least one of which has a defect. The defective-cylinder data indicative of the defective track cylinder or cylinders is prerecorded on the special track of one of the storage media, which special track is not accessible with the external cylinder-access signal from an external device such as a host computer. The data storage apparatus itself is provided with means for reading the special track and storing the defective-cylinder data indicative of the identification numbers of the defective track cylinders if any. In the event where one of the defective track cylinders is designated by the external device, the designated track cylinder is automatically replaced by an alternative track cylinder whose identification number is larger by the number of the defective track cylinders whose identification number is smaller than that of the designated track cylinder, so that the read/write head is positioned on the determined alternative track cylinder.

The above processing to determine the alternative track cylinder in place of the designated defective track cylinder is implemented within the data storage apparatus, independently of the external device such as a host computer. Accordingly, if this processing is seen on the side of the host computer, the data storage apparatus is operated as if the data storage media had no defective track cylinders in spite of the actual presence of defective cylinder tracks, or as if only the normal track cylinders are numbered. Thus, it is not necessary that the cylinder-access signals of the external host computer may be prepared irrespective of the presence of defective track cylinders, since the data storage apparatus is adapted to automatically skip the defective track cylinders if designated by the cylinder access signals, so that the read/write head is positioned on the suitably determined alternative track cylinders.

Hence, the manufacturer of the present data storage apparatus does not have to prepare a list of the defective tracks of the storage media incorporated therein, and attach the prepared list to the apparatus as a product. On the other hand, a manufacturer of a computer using such data storage apparatus does not have to store in the computer defect data on the defective track cylinders, upon installation of the data storage apparatus in the computer, or upon transfer of the apparatus from one computer to another, or upon modification of format of the storage media. Accordingly, the instant data storage apparatus is easy to handle for a user.

In the present data storage apparatus, the burst signals are used as the defective-cylinder data on the special track, contrary to the conventional data recorded on a storage medium, which represent defective track numbers and corresponding alternative-track numbers. Namely, the instant system according to the invention is more reliable than the conventional system, since the burst signals will not be entirely erased even if the special track has a defect. Thus, the present invention is effective to improve the yield of the data storage media, or minimize the rejects due to defects in the special track.

Further, the present arrangement does not require the read/write head to be moved a long distance from the designated defective track cylinder to the determined alternative track cylinder, thereby contributing to reduction in the throughput time of the apparatus.

According to one feature of the apparatus of the invention, the first means comprises: judging means for comparing reproduced signals obtained by the read/write head by reading the corresponding divisions of the special track, with a reference signal, and thereby checking each of the reproduced signals to see if the each reproduced signal indicates corresponding one of the at least one defective track cylinder; an index sensor generating an index signal at a predetermined angular position of the each storage medium; detecting means connected to the index sensor and operable after the generation of the index signal, for generating a pulse signal each time a time necessary for each of the divisions of the special track to pass the read/write head has lapsed; a counter for counting a number of the pulse signals generated by the detecting means; and memory means connected to the counter and the judging means, for storing as the defective-cylinder data a count of the counter when the judging means has determined that any one of the reproduced signals indicates corresponding one of the at least one defective track cylinder.

In one form of the above feature of the invention, the first means further comprises: delay means generating a high-level signal a predetermined short time after a rise of the pulse signal of the detecting means; and a latch circuit having a clock terminal connected to the judging means, a data terminal connected to the latch circuit to receive the high-level signal, and a reset terminal, the latch circuit latching the high-level signal applied to the data terminal if the high-level signal is present when a level of a signal from the judging means applied to the clock terminal becomes high, the latch circuit producing an output signal while the high-level signal is latched. The memory means consists of a microcomputer connected to the latch circuit and the counter. The microcomputer reads in the count of the counter while the output signal from the latch circuit is applied thereto, and applies a reset signal to the reset terminal of the latch circuit to reset the latch circuit after the counted number is read into the microcomputer.

BRIEF DESCRIPTION OF THE DRAWINGS

The foregoing and other objects, features and advantages of the present invention will be better understood by reading the following detailed description of a preferred embodiment of the invention, when considered in conjunction with the accompanying drawings, in which:

FIG. 6 is a timing chart of the signals produced by various components of the control system of FIG. 5.

DETAILED DESCRIPTION OF THE PREFERRED EMBODIMENT

To clarify the principle of the present invention, the preferred embodiment of the invention will be described in detail by reference to the accompanying drawings.

Figure 1:
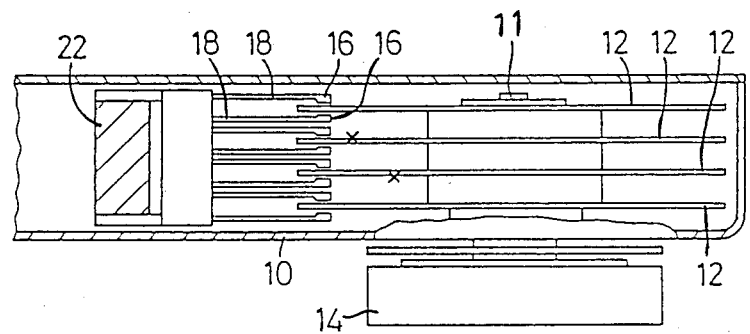
FIG. 1 is a fragmentary elevational view in cross section of a mechanical part of a data storage apparatus embodying the present invention.
Figure 2:
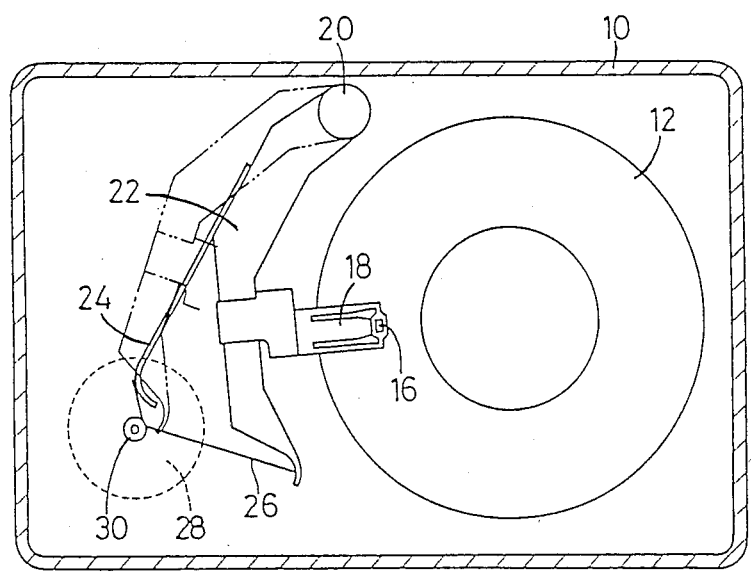
FIG. 2 is a cross sectional plan view of the mechanical part of the apparatus of FIG. 1.

Referring first to cross sectional views of FIGS. 1 and 2, there is shown a mechanical part of a magnetic data storage apparatus. In the figures, reference numeral 10 designates a casing in which four magnetic disks 12 as a data storage medium are disposed in a concentric relation with each other, and are rotated as a unit by a spindle 11 of a disk drive motor 14 attached to the housing 10. The magnetic disks 12 are spaced from each other by a suitable distance in the axial direction of the spindle 11. A pair of read/write magnetic heads 16, 16 are disposed on the opposite major surfaces of each magnetic disk 12. Therefore, a total of eight read/write heads 16 are provided for the four magnetic disks 12. Each magnetic head 16 is mounted on a cantilevered support 18 attached to a swing arm 22. The swing arm 22 is pivotally supported at its one end by a shaft 20. A sheet spring 24 is secured to one side surface of the swing arm 22, and a steel band 26 is disposed so as to span the free end of the swing arm 22 and an end portion of the sheet spring 24. The steel band 26 is wound at a portion thereof on a pulley 30 fixed on the drive shaft of a head-positioning stepping motor 28 secured to the casing 10. In this condition, the sheet spring 24 is elastically deformed, giving a tension to the steel band 26 and permitting a close fit of the steel band 26 on the surface of the pulley 30. A rotary motion of the pulley 30 by the stepping motor 28 causes the swing arm 22 to pivot about the shaft 20, whereby the magnetic head 16 on the cantilevered support 18 is moved substantially in the radial direction of the corresponding magnetic disk 12. The shaft 20, swing arm 22, sheet spring 24, steel band 26, head-positioning stepping motor 28, and pulley 30 constitute a substantive part of a head-positioning device for positioning the magnetic head 16 relative to the magnetic disk 12.

Figure 3:
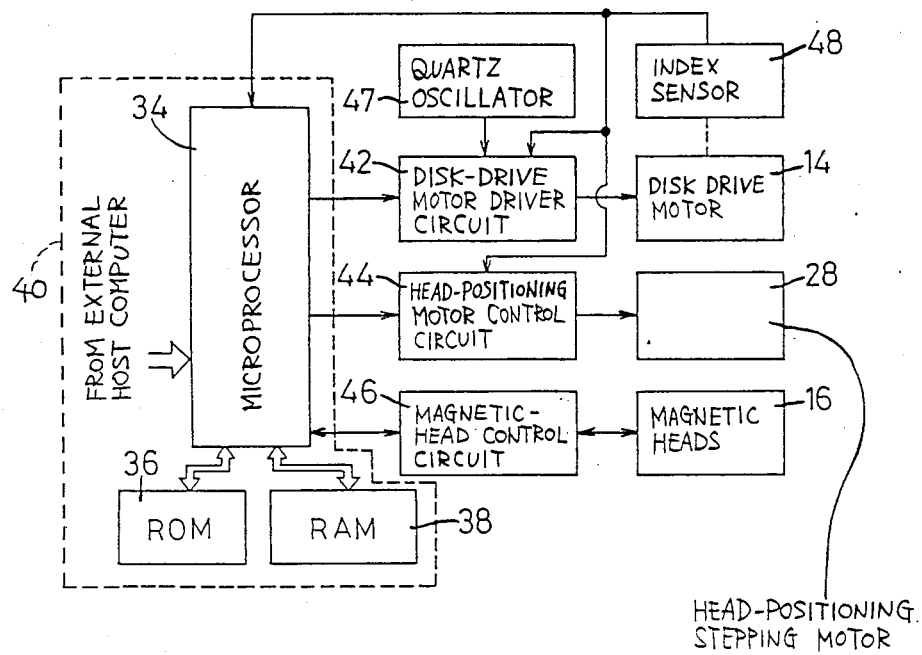
FIG. 3 is a schematic block diagram showing a general arrangement of a control system of the data storage apparatus.

Referring next to FIG. 3, there is shown a control system for controlling the disk drive motor 14, the magnetic heads 16 and the head-positioning motor 28. A major portion of the control system consists of a controller 40 which includes a microprocessor 34, a read-only memory (ROM) 36, and a random-access memory (RAM) 38. The controller 40 is adapted to control the operations of the disk drive motor 14, the head-positioning motor 28 and the magnetic heads 16, through a disk-drive motor driver circuit 42, a head-positioning motor control circuit 44, and a magnetic-head control circuit 46, respectively. The disk-drive motor 14 is operated at a constant speed, responsive to a CLOCK pulse SG14 generated by a quartz oscillator 47 connected to the disk-drive motor driver circuit 42. An index sensor 48 is connected to the microprocessor 34, the disk-drive motor driver circuit 42 and the head-positioning motor control circuit 44. This index sensor 48 generates an INDEX signal SG10, each time the rotor of the disk drive motor 14 is rotated by a predetermined angular increment. The INDEX signal SG10 is applied to the microprocessor 34, and to the circuits 42, 44.

Figure 4:
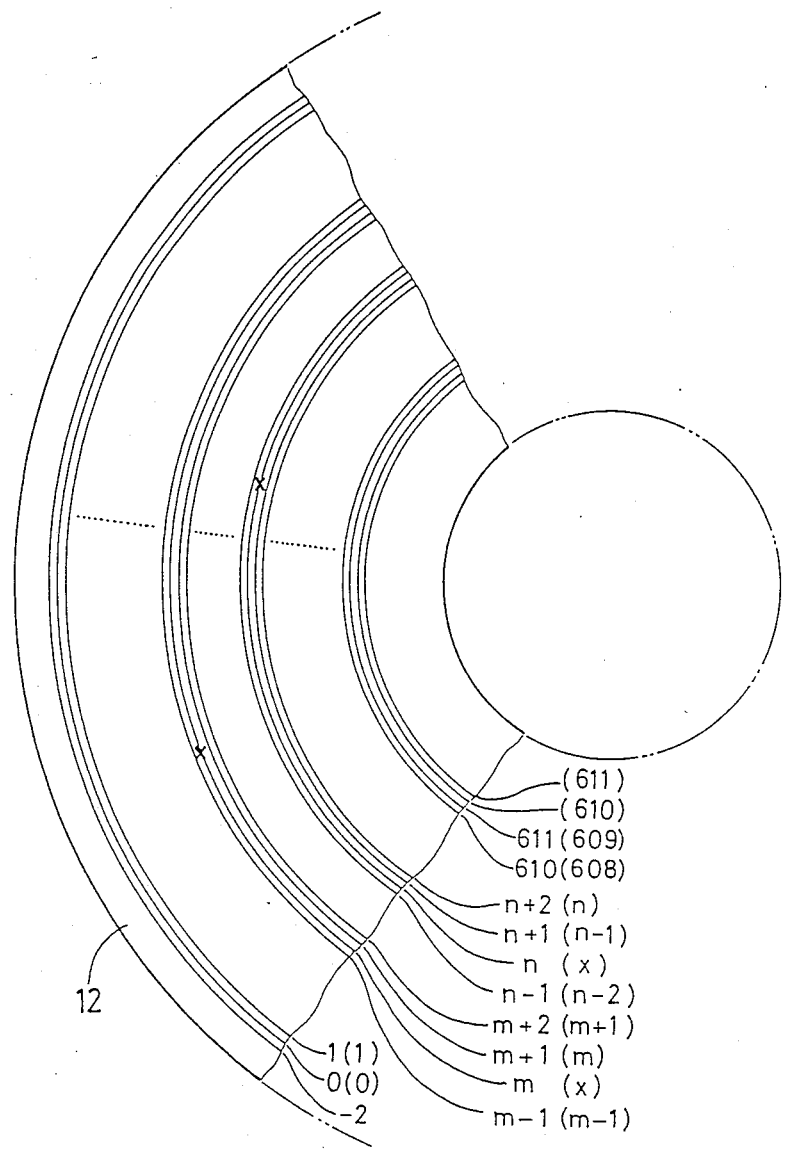
FIG. 4 is a view illustrating an arrangement of track cylinders formed by the tracks of the magnetic disks used in the data storage apparatus of FIGS. 1-3.

Each of the four magnetic disks 12 has a multiplicity of concentric recording tracks on which desired information is recorded. The tracks are identified by respective identification numbers. For the sake of description, it is assumed herein that the set of four magnetic disks 12 has defects at the tracks indicated by "x" in FIG. 4. Described more specifically, the second magnetic disk 12 (as counted from the top disk) has a defect at its track (m), and the third magnetic disk 12 has a defect at its track (n). The defective track (m) of the second magnetic disk 12 cooperates with the normal tracks (m) of the other magnetic disks 12 to form a defective track cylinder (m), as indicated in FIG. 4. Similarly, the defective track (n) of the third magnetic disk 12 cooperates with the normal tracks (n) of the other magnetic disks 12 to form a defective track cylinder (n), as also indicated in FIG. 4. Thus, the term "defective track cylinder" used herein is interpreted to mean a set of the tracks of the four magnetic disks 12 which have the same identification numbers and at least one of which has at least one defect. The defective track cylinders (m) and (n), which are given by way of example only, are not used for recording information. Stated in more detail referring to FIG. 4, if the magnetic data storage apparatus receives from an external host computer a track access command to obtain an access to a track of any one of the magnetic disks 12 which belongs to either one of the two defective track cylinders (m) and (n), this track designated by the external access command will not be actually accessed. Namely, the data storage apparatus is adapted to automatically skip any tracks of the defective track cylinders (m) and (n), as if the tracks of all magnetic disks 12 consisted of normal track cylinders which are numbered as indicated in parentheses in FIG. 4. Thus, for the external host computer from which control signals are sent to the instant data storage apparatus, a commanded data writing or reading operation is performed as if there existed no defective track cylinders.

Figure 5:
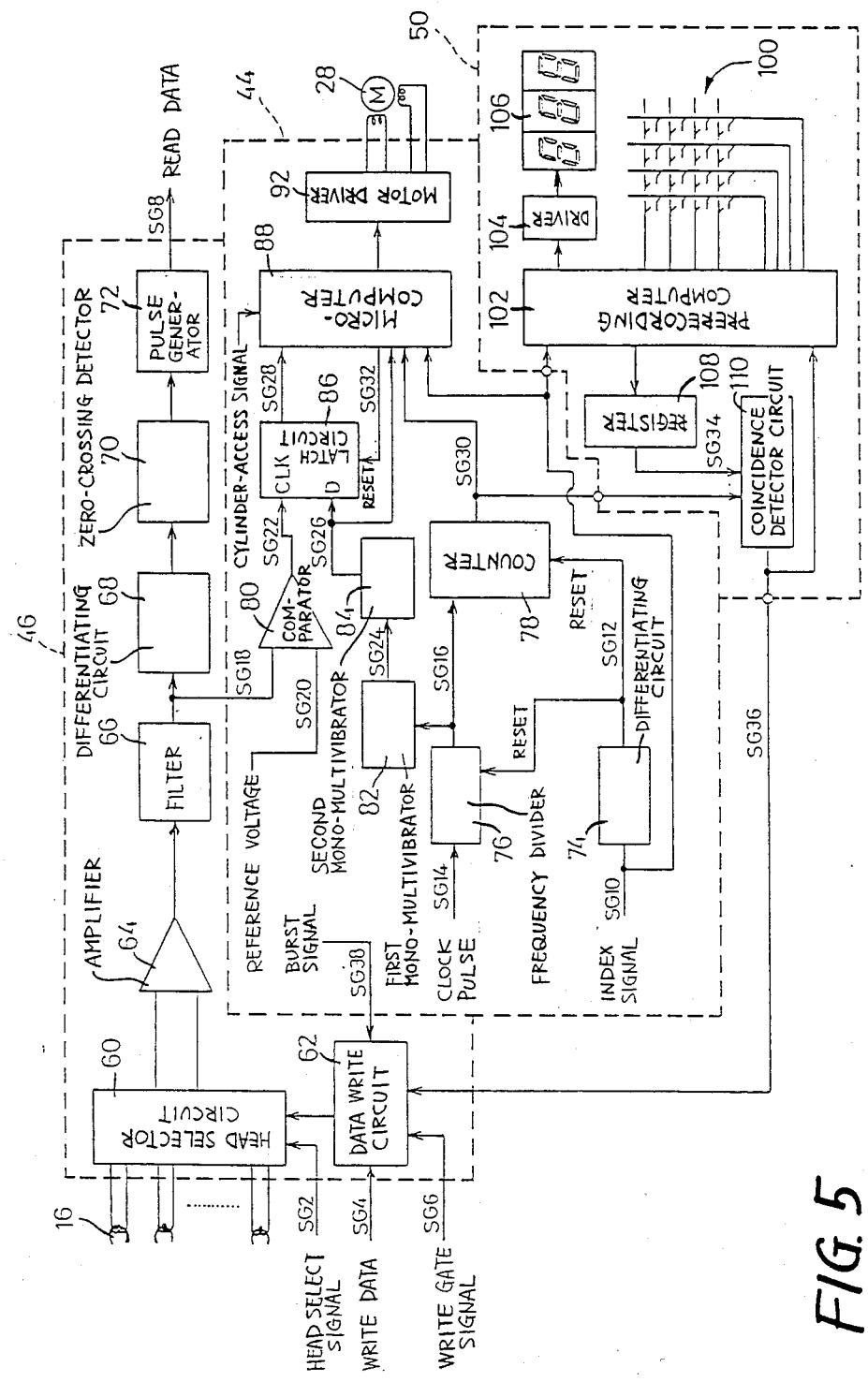
FIG. 5 is a block diagram of a part of the control system of the apparatus of FIG. 1 closely relating to the principle of the present invention.

A control circuit arrangement for automatically skipping the defective track cylinders is depicted in FIG. 5, wherein the magnetic read/write heads 16 are indicated at the left upper corner of the figure, and the head-positioning stepping motor 28 is indicated at the right-hand side end of the figure. The head-positioning motor control circuit 44 and the magnetic-head control circuit 46 are indicated in dashed lines. FIG. 5 further shows an arrangement of a recording device 50 for writing defective cylinder data indicative of the defective track cylinders, on one of the magnetic disks 12, as described later in detail. The instant data storage apparatus is connected to this recording device 50 when the storage apparatus is initially loaded with the magnetic disks 12 during manufacture of the apparatus.

The four magnetic heads 16 are connected to a head selector circuit 60, which selects one of the magnetic heads 16 according to a HEAD SELECT signal SG2 received from the controller 40. When a writing operation is performed, WRITE data SG4 from the host computer is sent via the controller 40 to a DATA WRITE circuit 62. This DATA WRITE circuit 62 has a write gate which is opened in response to a WRITE GATE signal SG6 received from the microprocessor 34. While the write gate is open, the DATA WRITE circuit 62 applies the received WRITE data SG4 to the magnetic head 16 selected by the head selector circuit 60, whereby the information represented by the WRITE data SG4 is written on the appropriate magnetic disk 12. On the other hand, when an operation to read the recorded information from one of the magnetic disks 12 is commanded, the reproduction signals produced by the appropriate magnetic head 16 are converted into READ data SG8 in the form of pulse signals, by an amplifier 64, a filter 66, a differentiating circuit 68, a zero-crossing detector 70 and a pulse generator 72. The obtained READ data SG8 is sent to the host computer through the controller 40. Thus, the magnetic-head control circuit 46 functions as a read/write control device for controlling reading and writing operations on the instant data storage apparatus.

One of the four magnetic disks 12 has a special track on one of its recording surfaces which corresponds to the selected one of the magnetic heads 16, for example, the first magnetic head 16 (head #0). This special track is located at track No. —2 which is radially outward of the multiplicity of recording tracks which are accessible with the external track-access (cylinder-access) signal from the external host computer. The special track No. —2 (track identification No.) is provided to store the defective-cylinder data indicative of the locations of the defective track cylinders having defects. More specifically, the special track No. —2 which is not accessible with the external access signal, has a multiplicity of divisions arranged in the circumferential direction of the disk 12. The divisions consist of first divisions corresponding to a multiplicity of normal track cylinders (normal recording tracks), and two second divisions which correspond to the two defective track cylinders (m) and (n). In the present embodiment, frequency burst signals are prerecorded as the defective-cylinder data on the special track No. —2 through the recording device 50. While the present embodiment is adapted to use the entire circumferential portion of the track No. —2 as the special track, it is possible that a portion of the track No. —2 is divided into sections or divisions corresponding to all of the track cylinders including the defective cylinders. Normally, the magnetic head 16 cannot be positioned radially outwardly beyond the track No. 0. However, after a calibrating operation of the apparatus upon commencement of a data writing or reading operation, the magnetic head 16 may be positioned at the special track No. —2, for reading the defective-cylinder data, i.e., the burst signals prerecorded on the special track, in order to find whether the set of four magnetic disks 12 has any defective track cylinders, and if any, to find the locations (identification numbers) of such defective track cylinders. This aspect of the instant data storage apparatus will be described in greater detail, referring to FIG. 6.

Initially, an INDEX signal SG10 is generated by the index sensor 48, and is applied to a differentiating circuit 74. An output signal SG12 of the differentiating circuit 72 is applied to a frequency divider 76 and a counter 78, whereby the divider 76 and the counter 78 are reset. The frequency divider 76 divides a CLOCK pulse SG14, and produces an output signal SG16 in the form of pulses corresponding to the respective divisions of the special track No. —2. As soon as the counter 78 has been reset in response to the INDEX signal SG10, the counter 78 starts counting the number of pulses of the output signal SG16 from the frequency divider 74. Therefore, the current count or content of the counter 78 represents the number of the division of the special track No. —2 which is currently read by the magnetic head 16, i.e., the corresponding identification number of the track cylinder (recording track).

The magnetic head 16 will detect the burst signals prerecorded in the divisions of the special track corresponding to the defective track cylinders (m, n), a time t2 after the fall of the INDEX signal SG10, the time t2 being obtained from the following formula:

t2=Nt1, where N: Identification number of defective track cylinder, and t1: time necessary for each division of the special track to pass the magnetic head 16.

In FIG. 6, there are shown reproduced signals SG18 which are obtained by the magnetic head 16 reading the special track and are filtered by the filter 66. The reproduced signal SG18 after the time lapse of t2 corresponds to the prerecorded burst signals, and is shown as FIG. 6 in the fourth signal (from the top of the figure), in enlargement in the horizontal axis (which represents time). The reproduced signal SG18 corresponding to each division of the special track is applied to a comparator 80 which also receives a REFERENCE voltage signal SG20. The level of an output signal SG22 of the comparator becomes high when the level of the reproduced signal SG18 is higher than that of the REFERENCE signal SG20.

Thus, the presence and location of any defective track cylinder can be detected depending upon whether the level of the output signal SG22 of the comparator 80 is high or not. To ensure this judgement while the magnetic head 16 is aligned in the middle of each division of the special track, a first and a second mono-multivibrator 82, 84 and a latch circuit 86 are provided. The level of an output signal SG24 of the first mono-multivibrator 82 becomes high in response to a rise of the output signal SG16 of the frequency divider 76. After a predetermined time, the level of the output signal SG24 becomes low, and the level of an output signal SG26 of the second mono-multivibrator 84 applied to a DATA terminal of the latch circuit 86 becomes high. The output signal SG26 is latched by the latch circuit 86 when the level of the output signal SG22 of the comparator 80 applied to the CLOCK terminal becomes high.

The latch circuit 86 is connected to a microcomputer 88, which starts to operate in response to the INDEX signal SG10. The microcomputer 88 reads in an output signal SG30 from the counter 78 and stores it in a memory incorporated therein, at a suitable point of time while the level of an output signal SG28 of the latch circuit 86 is held high. After the output signal SG26 of the second mono-multivibrator 84 applied to the DATA terminal of the latch circuit 86 has been turned off, the microcomputer 88 applies a RESET signal SG32 to a RESET terminal of the latch circuit 86, thereby resetting the latch. In the manner described above, the content of the counter 78 at the time when the magnetic head 16 detects the burst signal, that is, the identification number (location) of the corresponding track cylinder is stored in the memory of the microcomputer 88. Thus, the defective-cylinder data indicative of all defective track cylinders are stored in the microcomputer 88.

It is possible to reset the latch circuit 86 in response to the fall of the output signal SG26 of the second mono-multivibrator 84. In this case, however, it is impossible to verify that the microcomputer 88 has terminated the storage of the output signal SG30 of the counter 78. Since the microcomputer 88 is not able to read in the output signal SG30 of the counter 78 while the microcomputer 88 is executing another processing operation, the output signal SG26 of the second mono-multivibrator 84 may fall to reset the latch circuit 86 before the output signal SG30 of the counter 78 has been stored in the microcomputer 88. In this instance, therefore, the microcomputer 88 fails to store the defective-cylinder data even when the magnetic head 16 has read the burst signals indicative of a defective track cylinder. To avoid this inconvenience, the microcomputer 88 is adapted to reset the latch circuit 86 only after the storage of the output signal SG30 of the counter 78 into the microcomputer 88 is completed.

Each time the magnetic head 16 has detected the burst signal, the above steps of operations are repeated, whereby the identification numbers of all defective track cylinders of the magnetic disks 12 are stored in the microcomputer 88. Thus, the instant data storage apparatus is set ready for starting a data writing or reading operation. As is apparent from the foregoing description, the head-positioning motor control circuit 44, except a motor driver 92 incorporated therein, functions as means for storing the defective-cylinder data indicative of the defective track cylinders [(m) and (n) in this specific example].

When the controller 40 receives from the external host computer a track-access or cylinder-access signal designating a specific track on one of the four magnetic disks 12, the microcomputer 88 checks the stored defective-cylinder data to see if there is any defective track cylinder whose identification number is smaller than that of the designated track or track cylinder. If one or more defective track cylinders exist, the microcomputer 88 adds the number of these defective track cylinders to the identification number of the designated track. According to the obtained sum, the microcomputer 88 commands the motor driver 92 to operate the head-positioning stepping motor 28 in order to position the appropriate magnetic head 16 on the track or track cylinder whose identification number is equal to the obtained sum. As a result, the track cylinder whose number is larger than that of the designated track cylinder by the number of the defective track cylinders whose identification number is smaller than that of the designated cylinder. Thus, the microcomputer 88 functions as means for determining a track cylinder when the track designated by the external track-access signal is a defective track cylinder. This determination of an alternative track cylinder in place of a defective track cylinder, if seen on the side of the external host computer, results in positioning the magnetic head 16, as if the magnetic disks 12 had no defective track cylinders or as if only the normal track cylinders were numbered in the radially inward direction, regardless of any defective track cylinders.

While the operation of the present data storage apparatus has been described, the prerecording of the burst signals on the special track No. —2 on one of the four magnetic disks 12 will be described. This prerecording is effected at the final stage of manufacture of the data storage apparatus, i.e., at the time when the apparatus is initially loaded with the four magnetic disks 12.

First of all, all magnetic disks 12 are checked for any defective tracks, by a suitable detecting device, to find the locations (identification numbers) of all defective track cylinders. Then, the data storage apparatus loaded with the magnetic disks 12 is connected to the recording device 50. The identification numbers of the detected defective track cylinders of the disks 12 are stored into a memory in a prerecording computer 102 of the recording device 50, through an operation panel 100 having ten numeral keys. The prerecording computer 102 controls a display 106 through a driver 104, to indicate the entered identification numbers of the defective track cylinders.

After the data storage apparatus has been calibrated, the appropriate magnetic head 16 is positioned on the special track No. —2 of one of the magnetic disks 12. Upon generation of the INDEX signal SG10 from the index sensor 48, the counter 78 starts to count the number of the divisions of the special track which have passed the magnetic head 16. In the meantime, the INDEX signal SG10 is applied also to the prerecording computer 102. In response to this INDEX signal SG10, the computer 102 stores the smallest identification number of the first defective track cylinder into a register 108 of the device 50. An output signal SG34 of the register 108 indicative of the stored identification number is applied to a coincidence detector circuit 110. This detector circuit 110 also receives the output signal SG30 of the counter 78 indicative of the current count of the counter 78. The coincidence detector circuit 110 applies an INCIDENCE signal SG36 to the DATA WRITE circuit 62 while the output signals SG30 and SG34 coincide with each other. As a result, the write gate of the DATA WRITE circuit 62 is opened, and the appropriate BURST signals SG38 are fed to the appropriate magnetic head 16 (head #0) through the DATA WRITE circuit 62 and the HEAD SELECT circuit 60. Thus, the BURST signals SG38 are written on one of the divisions of the special track which corresponds to the defective track cylinder having the smallest identification number stored in the register 108.

The COINCIDENCE signal SG36 is also sent to the prerecording computer 102. In response to the fall of this signal SG36, the computer 102 stores in the register 108 the second smallest identification number of the second defective track cylinder. When the output signal SG34 of the register 108 coincides with the output signal SG30 of the counter 78, the COINCIDENCE signal SG36 is again generated by the coincidence detector circuit 110, whereby the BURST signals SG38 are recorded on the division of the special track No. —2 which corresponds to the second defective track cylinder. The above steps of operations are repeated for each of the following defective track cylinders if any. In this way, all divisions of the special track corresponding to all defective track cylinders of the magnetic disks 12 are loaded with the BURST signals SG38.

As is apparent from the foregoing explanation, the recording device 50 cooperates with the components of the data storage apparatus such as the index sensor 48, differentiating circuit 74, frequency divider 76 and counter 78, to prerecord the defective-cylinder data (BURST signals SG38) on the special track No. —2 of one of the magnetic disks 12. After the above prerecording is completed, the data storage apparatus is disconnected from the recording device 50. Thus, the data storage apparatus is loaded with the four magnetic disks 12 which appear as if there existed no defective track cylinders or defects, though the disks 12 in fact have the defective track cylinders (n) and (m) as shown in FIG. 4.

In the illustrated embodiment, the prerecording of the BURST signals SG38 (defective-cylinder data) on the special track No. —2, and the reading of the same signals SG38 from the special track, are both implemented while the magnetic disk 12 is rotated one full turn. However, this is not essential. Namely, the above prerecording and reading may be effected otherwise. For example, the recording and reading of the defective-cylinder data on and from each division of the special track may be accomplished each time the magnetic disk 12 is rotated one full turn. Further, it is possible that the BURST signals SG38 indicative of each defective track cylinder are recorded on or read from the corresponding division of the special track during each rotation of the magnetic disk 12. In this instance, the number of rotations of the magnetic disk 12 required to record or read the BURST signals SG38 is equal to the number of the defective track cylinders.

While the recording device 50 used in the illustrated embodiment is adapted to enter the defective-cylinder data through the ten numeral keys on the operation panel 100, it is possible that the recording of the BURST signals SG38 may be effected automatically from a defect detecting device coupled to the instant data storage apparatus.

While the BURST signals SG38 are recorded on the divisions of the special track corresponding to the defective track cylinders, the BURST signals may be recorded on the divisions of the special track which correspond to the normal track cylinders having no defects.

It will be obvious to those skilled in the art that the control system of the instant apparatus may be modified, as desired. For instance, the head-positioning motor control circuit 44 and magnetic-head control circuit 46 may be modified as needed to meet the specific requirements. Further, the number of special track is not limited to one. That is, the selected one of the magnetic disks 12 may have two or more special tracks. Moreover, two or more of the magnetic disks 12 may have a special track.

It is to be understood that the illustrated data storage apparatus may be adapted to use optical memory disks, and that various other changes, modifications and improvements may be made in the present invention, without departing from the spirit and scope of the invention defined in the following claims.

What is claimed is:

1. A method of writing or reading information on or from a storage medium in the form of a disk having a multiplicity of concentric recording tracks identified by respective identification numbers, said tracks including at least one defective track which has a defect, said method comprising the steps of:

obtaining the identification number of each of said at least one defective track;

providing said storage medium with a special track which is unaccessible with an external track-access signal, said special track having a multiplicity of divisions corresponding to the identification numbers of said multiplicity of recording tracks, said divisions consisting of a plurality of first divisions corresponding to normal tracks of said recording tracks, and at least one second division corresponding to said at least one defective track;

storing burst signals in one of each of said first divisions and said at least one second division of said special track, said burst signals being indicative of one of said normal tracks and said at least one defective track;

detecting, based on said burst signals, the identification number of each of said at least one defective track;

when said external track-access signal requires a writing or reading operation on one of said at least one defective track, selecting another of said multiplicity of tracks whose identification number is larger by one that the of said one of said at least one defective track, and effecting said writing or reading operation on said another track; and when a writing or reading operation is required on said another track, selecting yet another of said multiplicity of tracks whose identification number is larger by one than said another track, and effecting said writing or reading operation on said yet another track.

2. A method according to claim 1, wherein said burst signals are stored in each of said at least one second division of said special track.

3. A method of writing or reading information on or from a storage medium in the form of a disk having a multiplicity of concentric recording tracks identified by respective identification numbers, said tracks including at least one defective track which has a defect, said method comprising the steps of:

obtaining the identification number of each of said at least one defective track;

providing said storage medium with a special track which is unaccessible with an external track-access signal, said special track having a multiplicity of divisions corresponding to the identification numbers of said multiplicity of recording tracks, said divisions consisting of a plurality of first divisions corresponding to normal tracks of said recording tracks, and at least one second division corresponding to said at least one defective track;

storing burst signals in one of each of said first divisions and said at least one second division of said special track, said burst signals being indicative of one of said normal tracks and said at least one defective track;

detecting, based on said burst signals, the identification number of each of said at least one defective track;

when said external track-access signal requires a writing or reading operation on a selected one of said multiplicity of tracks, counting the number of said at least one defective track whose identification number is smaller than that of said selected one track; and selecting another of said multiplicity of tracks whose identification number is larger, by the counted number of said at least one defective track, than that of said selected one track, and effecting said writing or reading operation on said another track.

4. A method according to claim 3, wherein said burst signals are stored in each of said at least one second division of said special track.

5. A data storage apparatus including at least one storage medium in the form of a disk having a multiplicity of concentric recording tracks identified by respective identification numbers, a device for rotating all of said at least one storage medium as a unit, at least one read/write head corresponding to a recording surface of each of said at least one storage medium and movable along said surface of the corresponding storage medium substantially in a radial direction of said corresponding medium, a head-positioning device for moving said at least one read/write head, and a read/write control device for controlling a reading and a writing operation of said at least one read/write head according to external control signals, said data storage apparatus comprising:

at least one of said at least one storage medium having a special track which is unaccessible with said external control signals, and which has a multiplicity of divisions corresponding to said multiplicity of recording tracks, said divisions of said special track consisting of a plurality of first divisions and at least one second division;

each of said first divisions of said special track corresponding to each normal track cylinder consisting of the tracks of said at least one storage medium which have the same identification numbers and none of which has a defect, each of said at least one second division of said special track corresponding to each of at least one defective track cylinder consisting of the tracks of said at least one storage medium which have the same identification numbers and at least one of which has a defect, one of said each first division and said each second division storing burst signals indicative of one of said normal and defective track cylinders;

said head-positioning device being operable to position each of said at least one read/write head on said special track;

first means for operating said head-positioning device and said each read/write head to read said burst signals on said special track, and storing defective-cylinder data representative of an identification number of said each defective track cylinder; and second means responsive to a cylinder-access signal of said external control signals designating one of the normal and defective track cylinders, for counting a number of said at least one defective track cylinder whose identification number is smaller than that of the designated one track cylinder, and controlling said head-positioning device to position said each read/write head on another of said track cylinders whose identification number is larger, by said counted number, than that of said designated one track cylinder.

6. A data storage apparatus according to claim 5, wherein each of said at least one storage medium consists of a magnetic disk.

7. A data storage apparatus according to claim 5, wherein said special track is disposed radially outwardly of said multiplicity of recording tracks which are accessible with said cylinder-access signal.

8. A data storage apparatus according to claim 5, wherein said second means consists of a microcomputer.

9. A data storage apparatus according to claim 4, wherein said first means comprises:

judging means for comparing reproduced signals obtained by said read/write head by reading the corresponding divisions of said special track, with a reference signal, and thereby checking each of said reproduced signals to see if said each reproduced signal indicates a corresponding one of said at least one defective track cylinder;

an index sensor generating an index signal at a predetermined angular position of said each storage medium;

detecting means connected to said index sensor and operable after the generation of said index signal, for generating a pulse signal each time a time necessary for each of said divisions of said special track to pass said read/write head has lapsed;

a counter for counting a number of said pulse signals generated by said detecting means; and memory means connected to said counter and said judging means, for storing as said defective-cylinder data a count of said counter when said judging means has determined that any one of said reproduced signals indicates corresponding one of said at least one defective track cylinder.

10. A data storage apparatus according to claim 9, wherein said first means further comprises:

delay means generating a high-level signal a predetermined short time after a rise of said pulse signal of said detecting means;

a latch circuit having a clock terminal connected to said judging means, a data terminal connected to said latch circuit to receive said high-level signal, and a reset terminal, said latch circuit latching said high-level signal applied to said data terminal if said high-level signal is present when a level of a signal from said judging means applied to said clock terminal becomes high, said latch circuit producing an output signal while said high-level signal is latched; and said memory means consisting of a microcomputer connected to said latch circuit and said counter, said microcomputer reading in said count of said counter while said output signal from said latch circuit is applied thereto, said microcomputer applying a reset signal to said reset terminal of said latch circuit to reset the latch circuit after said counted number is read into the microcomputer.

11. A device for writing said burst signals on said special track on said each storage medium of a data storage apparatus as defined in claim 9, comprising:

a prerecording computer having a memory for storing said identification number of each of said at least one defective track cylinder whose data has been prepared;

a register connected to said prerecording computer; and a coincidence detecting circuit connected to said register, said counter and said prerecording computer;

said prerecording computer being responsive to said index signal generated by said index sensor, to store in said register the smallest identification number of said at least one defective track number, and being responsive to each coincidence signal generated by said coincidence detecting circuit, to store in said register the following identification numbers of said at least one defective track number if any, one at a time for said each coincidence signal, said coincidence detecting circuit generating said each coincidence signal when said count of said counter coincides with the identification number currently stored in said register, said each coincidence signal being applied to said prerecording computer and said read/write control device, said read/write control device controlling said each read/write head to write said burst signals on said each first division or said each second division of said special track of said each storage medium, depending upon whether said each coincidence signal is present or not.

12. An apparatus according to claim 5, wherein one of said at least one storage medium has said special track.

13. An apparatus according to claim 5, wherein said burst signals are stored in each of said at least one second division of said special track.

* * * * *